Figure 5:
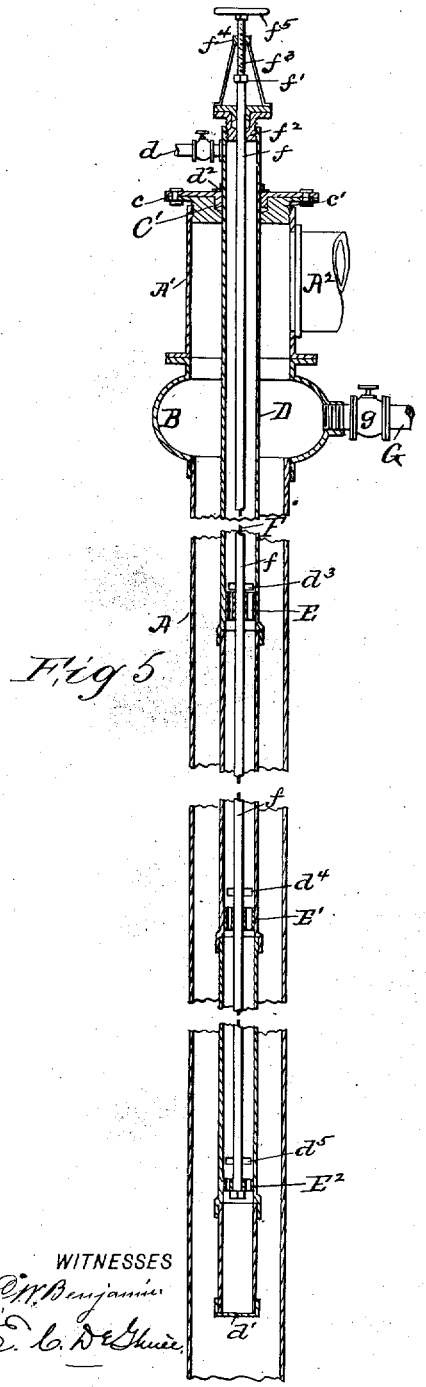

2 Sheets—Sheet 1.
S. W. TITUS.
APPARATUS FOR USING COMPRESSED AIR TO ELEVATE WATER.
No. 11,675. Reissued June 28, 1898.
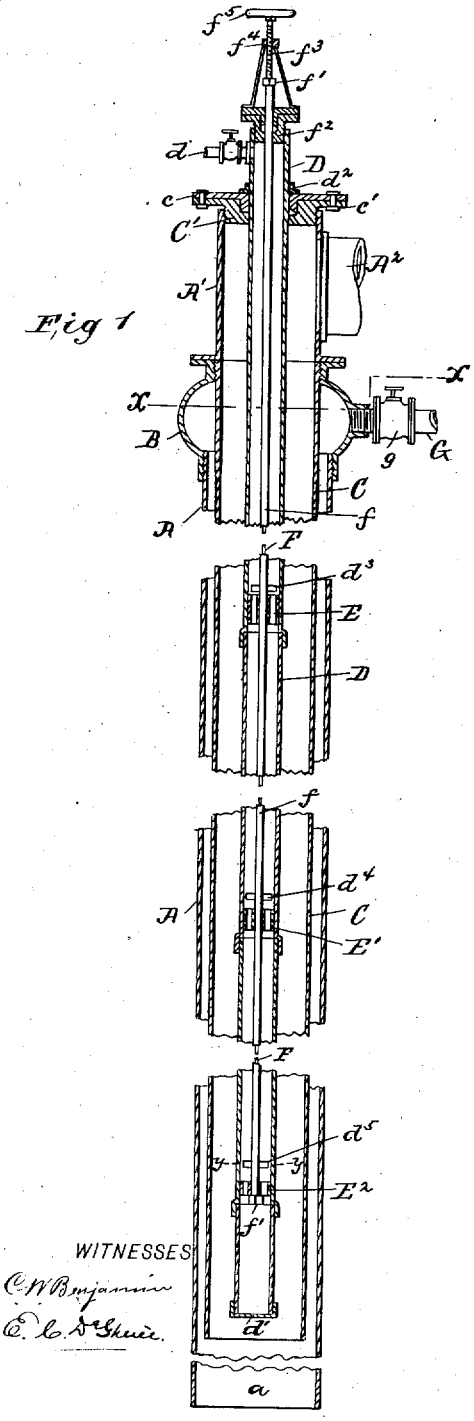
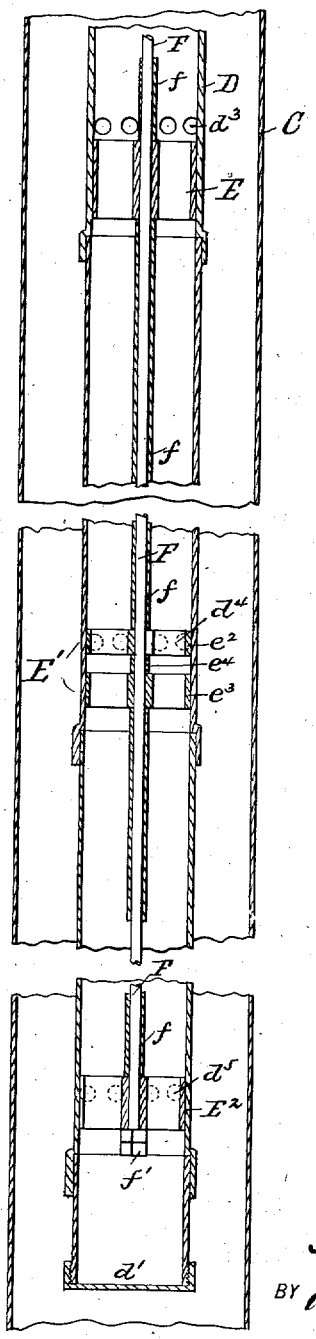
Fig 2
WITNESSES
C. W. Benjamin
E. C. DeGroot
INVENTOR:
Silas W. Titus,
BY Arden S. Fitch,
ATTORNEY 2 Sheets—Sheet 2.

S. W. TITUS.

APPARATUS FOR USING COMPRESSED AIR TO ELEVATE WATER.

No. 11,675. Reissued June 28, 1898.

WITNESSES
D. W. Benjamin
E. C. DeGhuie

INVENTOR
Silas W. Titus
BY Arden A. Fitch.
ATTORNEY

UNITED STATES PATENT OFFICE.

SILAS W. TITUS, OF NEW YORK, N. Y., ASSIGNOR TO THE PNEUMATIC ENGINEERING COMPANY, OF WEST VIRGINIA.

APPARATUS FOR USING COMPRESSED AIR TO ELEVATE WATER.

SPECIFICATION forming part of Reissued Letters Patent No. 11,675, dated June 28, 1898.

Original No. 566,102, dated August 18, 1896. Application for reissue filed February 25, 1898. Serial No. 671,717.

*To all whom it may concern:*

Be it known that I, SILAS W. TITUS, a citizen of the United States, residing at New York, (borough of Brooklyn,) county of Kings, State of New York, have invented certain new and useful Improvements in Apparatus for Using Compressed Air to Elevate Water, of which the following is a full, clear, and exact description, reference being had to the accompanying drawings, forming part of this specification.

My invention relates to the art of elevating water from wells or other sources of supply through tubes or casings sunk into the water or water-bearing strata by means of compressed air injected into the water column, which rises by natural pressure within the tube or casing, the weight of said water column being overcome by the injected compressed air.

My invention relates particularly to apparatus adapted to effect the injection of compressed air into a water column in an eduction-tube and either simultaneously or successively at several different points throughout its height; and my invention also has particular relation to apparatus adapted to permit the water within the well tube or casing, in which is an eduction-tube and a compressed-air-supply pipe, to be independently affected by either an air-pressure, an air-exhaust, or hydraulic pressure, as occasion may require.

My invention consists in the combination, in an apparatus of the class stated, with a water-eduction tube, of a compressed-air-supply pipe provided with lateral apertures at several points throughout its height, whereby air may be injected into said eduction-tube at different depths, together with a series of cut-offs or valves adapted to open and close said apertures, and means for operating said cut-offs or valves; and my invention also comprises the said devices in combination when said cut-offs or valves are adapted to successively open said apertures in the air-pipe, beginning at the point nearest the discharge end of the eduction-tube, and while each said aperture or set of apertures is thus open to maintain the other apertures or sets of apertures closed; and my invention further includes the aforesaid devices in combination when said apertures in the air-pipe within the eduction-tube are on opposite sides thereof, and said cut-offs or valves for closing said apertures are a series of hollow cylinders adapted to play within the bore of said air-pipe.

Figure 3:
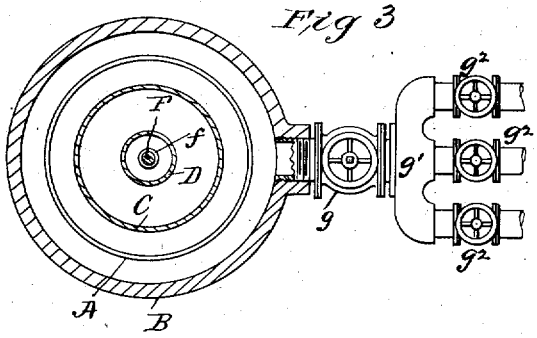
Figure 4:
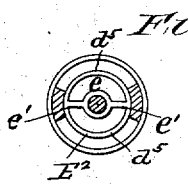

In the drawings, Figure 1 is a vertical central sectional elevation of an apparatus containing my invention. Fig. 2 is a similar view of a detached eduction-tube and its air-supply pipe through a portion of their length and showing a modification of my invention enlarged. Fig. 3 is a cross-section of my apparatus on line $x\,x$ of Fig. 1 enlarged. Fig. 4 is a cross-section of the parts on line $y\,y$ of Fig. 1 enlarged, and Fig. 5 is a vertical central sectional elevation of a modified form of the apparatus in which the well-casing constitutes the eduction-tube.

A is a well tube or casing adapted in length to have its intake end $a$ submerged or sunk into the water-source or water-bearing strata in the manner well known in the art. This well tube or casing may constitute the water-eduction tube of the apparatus, as illustrated in Fig. 5, wherein the discharge from the tube is shown leading through a cap B on the top of the tube, and a tube-section A′, which surmounts said cap and is provided with a spout or conduit $A^2$, as illustrated in Fig. 1.

D is the compressed-air-supply pipe, having at its upward end valved connection $d$ with a compressed-air reservoir or other source of supply and preferably adapted to extend longitudinally within the eduction-tube, as shown, and may be closed at its lower end, as by a cap $d'$. The said pipe D may be fixedly supported in place in the apparatus by means of a collar $d^2$, seated upon the face of the gland $c$ of a stuffing-box $c'$ in an apertured plug C′, which may be employed to close the top of said eduction-tube and through which plug the said air-pipe passes.

At several different points throughout its height within the eduction-tube the said air-pipe D is provided with lateral apertures in its wall, as at $d^3$ $d^4$ $d^5$, and these apertures may be in the form of circumferentially-extending slots, as illustrated in Fig. 1, or in the form of a series of circular apertures, as illustrated in Fig. 2, and it will be found desirable to constitute the said apertures at the several points or places in the pipe-wall on opposite sides of said pipe, as shown.

At E E′ $E^2$ are shown cut-offs, valves, or gates, preferably within the air-pipe D and adapted to open and close the aforesaid apertures $d^3$ $d^4$ $d^5$ in the pipe-wall. These cut-offs or valves are preferably constituted of hollow cylinders having a central hub *e* interiorly united to them by radial arms *e′*, which permits the passage of air through them within the air-pipe. The hubs are bored to receive a rod F common to all the cut-offs, and the cut-offs are maintained at the desired distance apart on the rod relatively to the location of the apertures in the pipe-wall by sections of tubing *f*, fitted to the rod between the several cut-offs, the cut-offs and said sleeves being desirably secured together on the rod by nuts *f′* on the rod above and below them, as shown.

The top of the air-pipe may be closed by an apertured plug $f^2$, provided with a stuffing-box, as shown, through which the rod F extends and beyond which said rod is screw-threaded, as at $f^3$, whereat it works in a nut $f^4$, supported above said air-pipe, and where it may be provided with a hand-wheel $f^5$ for its convenient manipulation in raising and lowering the rod and the attached cut-offs. The said cut-offs being cylindrical in form, as described, and hollow and the pipe D having apertures, as set forth, which extend circumferentially or at opposite sides of said pipe, the said cut-offs are balanced against the pressure of air and water and therefore have play in the pipe D practically without friction, while the air-discharge will be effected throughout the circumference of the pipe, so that it will act at each aperture or set of apertures upon the entire horizontal area of the water column in the surrounding eduction-tube at such several points therein.

The cut-offs may be so formed and arranged as to adapt them to leave the several apertures or sets of apertures all open at the same time, and the cut-offs may be respectively made of such lengths that when manipulated to open or close one or more of said several apertures or sets of apertures others of said apertures will be maintained open or closed. For example, the uppermost cut-off E may be made longest, and the lowest, $E^2$, shortest, as illustrated in Fig. 1, so that when the rod and its attached cut-offs are raised the uppermost apertures $d^3$ may be closed and apertures $d^4$ and $d^5$ left open and so that when the rod and its cut-offs are further raised the apertures $d^4$ next below the uppermost ones $d^3$ may be also closed, but still leaving the lower apertures $d^5$ open.

By means of the described devices the compressed air may be injected into the water column in the eduction-tube at such point or points as will most effectively overcome the weight of said water column relatively to the natural pressure in the well, so as to enable the maximum discharge of water by said natural pressure to be closely approximated. In an apparatus in which the compressed-air-supply pipe discharges the air into the eduction-tube only at its open lower end a like result is practically attainable only by raising and lowering the entire air-supply pipe, which is an inconvenient and cumbersome operation. In the apparatus herein described it is necessary, in order to change the point in the height of the water column at which to effect the injection of the compressed air, to simply manipulate the hand-wheel of the cut-off rod for the purpose of raising or lowering the cut-offs.

By means of the arrangement of the cut-offs shown in Fig. 2 a further advantage is attainable by my invention. In this modification of the apparatus the cut-off E for the apertures $d^3$ in the uppermost part of the air-pipe, at the point toward the discharge of the surrounding eduction-tube, is of such a length that it will maintain said apertures closed while the apertures at all points below are successively open. The cut-off E′ for the apertures $d^4$ next below is adapted to maintain said apertures closed while the aforesaid uppermost apertures $d^3$ are open and to open said apertures $d^4$ as soon as said apertures $d^3$ are closed, and then to close said apertures $d^4$ again, while the cut-off $E^2$ for the lowermost apertures $d^5$ is adapted to maintain the said apertures $d^5$ closed during the time the upper apertures $d^3$ and $d^4$ are successively open, as described, and to open said apertures $d^5$ as soon as said intermediate apertures $d^4$ are closed subsequently to the closing of the uppermost aperture $d^3$ and the opening and closing of the intermediate apertures $d^4$. To effect this the intermediate cut-off E′, Fig. 2, may be composed of separate cylindrical sections $e^2$ and $e^3$, maintained in proper relations to each other on the rod F by a short tube or sleeve $e^4$, the section $e^2$ serving to close the apertures $d^4$ while the apertures $d^3$ are open, while the space between the sections permits the apertures $d^4$ to open as soon as the apertures $d^3$ are closed, and the section $e^3$ serving to thereafter close the apertures $d^4$ when the apertures $d^5$ are opened. An apparatus having this described arrangement of devices, as illustrated in Fig. 2, is specially serviceable in initiating a flow or a promotion of the natural flow from a well of such great depth that it is impracticable by means of present known appliances to economically generate and maintain an air-pressure adequate to overcome the weight of the entire water column, which rises by natural pressure in the eduction-tube by means of compressed air injected into the lower portion of such water column.

It is evident that by means of the described devices shown in Fig. 2 the compressed air may be injected into the water column in the eduction-tube at several points successively from its top downward throughout its height at a pressure adequate to successively overcome the weight of the respective portions of said column immediately above and successively between said several points of air-injection and that the injection of the compressed air into said column may be successively terminated at said several points from its top downward and that the injection of the air may then be maintained at said lowest point into the lower portion of said column, so that the upper part or head of the column will be first lifted, then the portion of the column immediately below the head, and finally the lower portion of the column, thereby setting in motion the entire column and maintaining the movement by the use of air at a practically and economically attainable pressure.

The cap or head-piece B may be adapted to approximately hermetically close the top of the well tube or casing A, as shown, and may be made hollow, as illustrated. The eduction-tube C passes through said cap, as hereinbefore described, its lower end opening into the well-casing and its upper end having the discharge-spout, and above that closed by the plug described, through which the air-pipe D passes, as set forth.

G is a pipe leading into the cap B and thence communicating with the interior of the well-tube outside the eduction-tube. This pipe G is adapted to be connected with an air-compressor and, if desired, with an exhaust-pump or a hydraulic force-pump, (not shown,) and for this purpose the pipe G may be provided with the governing-valve $g$ and beyond said valve may be provided with the triple connection $g'$, each union of said connection having an individual governing-valve $g^2$. Compressed air may be supplied through one of said unions from an air compressor or reservoir to maintain a graduated pressure upon the surface of the water between the well-tube and eduction-tube for the purpose of depressing the level of the water in the well-tube and raising its level in the eduction-tube, and thus increasing the degree of submergence of the contained-air pipe D as occasion may require. The atmospheric pressure upon the surface of the water between the well-tube and the eduction-tube may be removed or lessened by suction from an exhaust-pump connected to another of said unions of the connection $g'$, as occasion may require. Water may be forced down through the space between the well-tube and the eduction-tube by means of a hydraulic force-pump connected to the remaining one of said unions of the connection $g'$ for the purpose of dislodging and facilitating the removal of sand or other material which may have settled in the well.

It is obvious that the described apparatus may be used in elevating liquids other than water and that other aeroform fluids than compressed air may be employed in the operation thereof, as described.

What I claim as my invention, and desire to secure by Letters Patent, is—

1. In a compressed-air water-elevating apparatus, the combination with a water-eduction tube, of a compressed-air-supply pipe provided with lateral apertures at several different points throughout its height, whereby air may be injected into said eduction-tube at different depths, together with a series of cut-offs or valves adapted to open and close said apertures at one or more of said different points, and means for operating said cut-offs or valves; substantially as and for the purpose set forth.

2. In a compressed-air water-elevating apparatus, the combination with a water-eduction tube, of a compressed-air-supply pipe within said tube and provided with lateral apertures at several different points throughout its height, said apertures at each such point being on opposite sides of said air-pipe, and a series of hollow cylindrical cut-offs within said air-pipe adapted to open and close said apertures at one or more of said different points, and means for operating said cut-offs; substantially as and for the purpose set forth.

3. In a compressed-air, water-elevating apparatus, the combination with a water-eduction tube, of a compressed-air-supply pipe within said tube and provided with lateral apertures at several different points throughout its height, and a series of cut-offs or valves, within said air-pipe adapted, to successively open said apertures in said air-pipe, beginning at the point nearest the discharge end of said inclosing eduction-tube, and, while each of said apertures is thus open, to maintain the other apertures closed, and means for operating said cut-offs or valves; substantially as and for the purpose set forth.

4. In a compressed-air water-elevating apparatus, the combination with a water-eduction tube, of a compressed-air-supply pipe within said tube and provided with lateral apertures at several different points throughout its height, and a series of cut-offs, or valves, within said pipe, composed of hollow cylinders, the uppermost of which is of a length to maintain the uppermost apertures closed while the lower apertures are open, the lowermost of which is of a length to maintain the lowermost apertures closed until the apertures above are closed, and the intermediate of which is formed of sections adapted to successively close the intermediate apertures, and means for operating said cut-offs or valves; substantially as and for the purpose set forth.

SILAS W. TITUS.

Witnesses:
ARDEN S. FITCH,
C. W. BENJAMIN.